(12) United States Patent
Zhang et al.

(10) Patent No.: US 11,907,850 B2
(45) Date of Patent: Feb. 20, 2024

(54) TRAINING IMAGE-TO-IMAGE TRANSLATION NEURAL NETWORKS

(71) Applicant: Google LLC, Mountain View, CA (US)

(72) Inventors: Rui Zhang, Beijing (CN); Jia Li, Alto, CA (US); Tomas Jon Pfister, Foster City, CA (US)

(73) Assignee: Google LLC, Mountain View, CA (US)

( * ) Notice: Subject to any disclaimer, the term of this patent is extended or adjusted under 35 U.S.C. 154(b) by 274 days.

(21) Appl. No.: 17/454,516

(22) Filed: Nov. 11, 2021

(65) Prior Publication Data

US 2022/0067441 A1 Mar. 3, 2022

Related U.S. Application Data

(63) Continuation of application No. 16/688,773, filed on Nov. 19, 2019, now Pat. No. 11,205,096.

(Continued)

(51) Int. Cl.
| | |
|---|---|
| *G06N 3/084* | (2023.01) |
| *G06F 18/214* | (2023.01) |
| *G06F 18/22* | (2023.01) |
| *G06F 18/21* | (2023.01) |
| *G06F 18/2413* | (2023.01) |

(Continued)

(52) U.S. Cl.
CPC ........... *G06N 3/084* (2013.01); *G06F 18/214* (2023.01); *G06F 18/2148* (2023.01); *G06F 18/2193* (2023.01); *G06F 18/21347* (2023.01); *G06F 18/22* (2023.01); *G06F 18/2413* (2023.01); *G06N 3/045* (2023.01); *G06N 3/047* (2023.01); *G06V 10/761* (2022.01);

(Continued)

(58) Field of Classification Search
None
See application file for complete search history.

(56) References Cited

U.S. PATENT DOCUMENTS

2018/0247201 A1 8/2018 Liu et al.

OTHER PUBLICATIONS

Chen Y, Zhao Y, Jia W, Cao L, Liu X. Adversarial-learning-based image-to-image transformation: A survey. Neurocomputing. Oct. 21, 2020;411:468-86. (Year: 2020).*

(Continued)

*Primary Examiner* — Emily C Terrell
*Assistant Examiner* — Nathan J Bloom
(74) *Attorney, Agent, or Firm* — Honigman LLP; Brett A. Krueger (57) ABSTRACT

A method includes obtaining a source training dataset that includes a plurality of source training images and obtaining a target training dataset that includes a plurality of target training images. For each source training image, the method includes translating, using the forward generator neural network G, the source training image to a respective translated target image according to current values of forward generator parameters. For each target training image, the method includes translating, using a backward generator neural network F, the target training image to a respective translated source image according to current values of backward generator parameters. The method also includes training the forward generator neural network G jointly with the backward generator neural network F by adjusting the current values of the forward generator parameters and the backward generator parameters to optimize an objective function.

20 Claims, 3 Drawing Sheets

Related U.S. Application Data (60) Provisional application No. 62/769,211, filed on Nov. 19, 2018.

(51) Int. Cl.
| | |
|---|---|
| *G06F 18/2134* | (2023.01) |
| *G06N 3/045* | (2023.01) |
| *G06N 3/047* | (2023.01) |
| *G06V 10/74* | (2022.01) |
| *G06V 10/764* | (2022.01) |
| *G06V 10/774* | (2022.01) |
| *G06V 10/82* | (2022.01) |

(52) U.S. Cl.
CPC .......... *G06V 10/764* (2022.01); *G06V 10/774* (2022.01); *G06V 10/82* (2022.01)

(56) References Cited

OTHER PUBLICATIONS

Shamsolmoali P, Zareapoor M, Granger E, Zhou H, Wang R, Celebi ME, Yang J. Image synthesis with adversarial networks: A comprehensive survey and case studies. Information Fusion. Aug. 1, 2021;72:126-46. (Year: 2021).*

Benaim S, Wolf L. One-Sided Unsupervised Domain Mapping. arXiv preprint arXiv:1706.00826. Jun. 2017. (Year: 2017).*

I. P. Gunawan and M. Ghanbari, "Image quality assessment based on harmonics gain/loss information," IEEE International Conference on Image Processing 2005, Genova, Italy, 2005, pp. I-429, doi: 10.1109/ICIP.2005.1529779. (Year: 2005).*

Huang H, Yu PS, Wang C. An introduction to image synthesis with generative adversarial nets. arXiv preprint arXiv:1803.04469. Mar. 12, 2018. (Year: 2018).*

Tang H, Xu D, Wang W, Yan Y, Sebe N. Dual generator generative adversarial networks for multi-domain image-to-image translation. InAsian Conference on Computer Vision Dec. 2, 2018 (pp. 3-21). Cham: Springer International Publishing. (Year: 2018).*

Choi Y, Choi M, Kim M, Ha JW, Kim S, Choo J. StarGAN: Unified Generative Adversarial Networks for Multi-domain Image-to-Image Translation. In2018 IEEE/CVF Conference on Computer Vision and Pattern Recognition (CVPR) Jun. 1, 2018 (pp. 8789-8797). IEEE Computer Society. (Year: 2018).*

Li M, Huang H, Ma L, Liu W, Zhang T, Jiang Y. Unsupervised image-to-image translation with stacked cycle-consistent adversarial networks. InProceedings of the European conference on computer vision (ECCV) Sep. 2018 (pp. 184-199). (Year: 2018).*

Zhao J, Zhang J, Li Z, Hwang JN, Gao Y, Fang Z, Jiang X, Huang B. Dd-cyclegan: Unpaired image dehazing via double-discriminator cycle-consistent generative adversarial network. Engineering Applications of Artificial Intelligence. Jun. 1, 2019; 82:263-71. (Year: 2019).*

Dai L, Tang J. iFlowGAN: An invertible flow-based generative adversarial network for unsupervised image-to-image translation. IEEE Transactions on Pattern Analysis and Machine Intelligence. Mar. 2, 2021;44(8):4151-62. (Year: 2021).*

Zhang W, Ouyang W, Li W, Xu D. Collaborative and adversarial network for unsupervised domain adaptation. InProceedings of the IEEE conference on computer vision and pattern recognition 2018 (pp. 3801-3809). (Year: 2018).*

Li C, Wand M. Precomputed real-time texture synthesis with markovian generative adversarial networks. InComputer Vision—ECCV 2016: 14th European Conference, Amsterdam, The Netherlands, Oct. 11-14, 2016, Proceedings, Part III 14 2016 (pp. 702-716). Springer International Publishing. (Year: 2016).*

Kazemi H, Soleymani S, Taherkhani F, Iranmanesh SM, Nasrabadi NM. Unsupervised Image-to-Image Translation Using Domain-Specific Variational Information Bound. arXiv e-prints. Nov. 2018:arXiv-1811. (Year: 2018).*

Li M, Huang H, Ma L, Liu W, Zhang T, Jiang Y. Unsupervised image-to-image translation with stacked cycle-consistent adversarial networks. InProceedings of the European conference on computer vision (ECCV) Jun. 26, 2018 (pp. 184-199). (Year: 2018), 16 pages.

Zhao, Jingming, et al. "DD-cycleGAN: unpaired image dehazing via double-discriminator cycle-consistent generative adversarial network." Engineering Applications of Artificial Intelligence 82 (Jun. 2019): 263-271. (Year: 2019), 7 pages.

Li C, Wand M. "Precomputed real-time texture synthesis with markovian generative adversarial networks." In European conference on computer vision Oct. 8, 2016 (pp. 702-716). Springer, Cham. (Year: 2016), 15 pages.

Kazemi H, Soleymani S, Taherkhani F, Iranmanesh SM, Nasrabadi NM. "Unsupervised Image-to-Image Translation Using Domain-Specific Variational Information Bound." InNeurIPS Jan. 1, 2018. (Year: 2018).

L. Dai and J. Tang, "iFlowGAN: An Invertible Flow-based Generative Adversarial Network for Unsupervised Image-to-Image Translation," in IEEE Transactions on Pattern Analysis and Machine Intelligence, doi: 10.1109/TPAMI.Mar. 2021.3062849. (Year: 2021).

P. Isola, J.-Y. Zhu, T. Zhou, and A. A. Efros, "Image-to-Image Translation with Conditional Adversarial Networks," in IEEE Conference on Computer Vision and Pattern Recognition. Honolulu, HI: IEEE, Jul. 2017, pp. 5967-5976. (Year: 2017), 9 pages.

W. Zhang, D. Xu, W. Ouyang and W. Li, "Self-Paced Collaborative and Adversarial Network for Unsupervised Domain Adaptation," in IEEE Transactions on Pattern Analysis and Machine Intelligence, vol. 43, No. 6, pp. 2047-2061, Dec. 25, 2019, doi: 10.1109/TPAMI.2019.2962476. (Year: 2019), 15 pages.

Choi Y, Choi M, Kim M, Ha JW, Kim S, Choo J. "StarGAN: Unified Generative Adversarial Networks for Multi-domain Image-to-Image Translation." In2018 IEEE/CVF Conference on Computer Vision and Pattern Recognition Jun. 18, 2018 (pp. 8789-8797). IEEE. (Year: 2018), 8 pages.

Zhu, J.Y., Park, T., Isola, P., Efros, A.A.: "Unpaired image-to-image translation using cycleconsistent adversarial networks." In: ICCV (2017) (Year: 2017).

Arjovsky et al., "Wasserstein generative adversarial networks", ICML, 2017, 10 pages.

Barnes et al., "Patchmatch: A randomized correspondence algorithm for structural image editing", ACM Trans. Graphics (ToG), 2009, 21 pages.

Belkin et al., "Manifold regularization: A geometric framework for learning from labeled and unlabeled examples", JMLR, 2006, 36 pages.

Benaim et al., "One-sided unsupervised domain mapping", NIPS, 2017, 11 pages.

Chen et al., "Deeplab: Semantic image segmentation with deep convolutional nets, atrous convolution, and fully connected crfs", IEEE transactions on pattern analysis and machine intelligence, 40(4): 834-848, 2018, 14 pages.

Chen et al., "Photographic image synthesis with cascaded refinement networks", ICCV, 2017, 10 pages.

Cohen et al., "Distribution matching losses can hallucinate features in medical image translation", MICCAI, 2018, 11 pages.

Cordts et al., "The cityscapes dataset for semantic urban scene understanding", CVPR, 2016, 29 pages.

Criminsi et al., "Region filling and object removal by exemplar-based image inpainting", IEEE Trans. image processing, 2004, 13 pages.

Dar et al., "Image synthesis in multi-contrast MRI with conditional generative adversarial networks", arXiv preprint, 2018, 28 pages.

Efros et al., "Image quilting for texture synthesis and transfer", Proc. Computer graphics and interactive techniques, 2001, 6 pages.

Goodfellow et al., "Generative adversarial nets", NIPS, 2014, 9 pages.

Hertzmann et al., "Image analogies", Proc. Computer graphics and interactive techniques, 2001, 14 pages.

Hoffman et al., "Cycada: Cycle-consistent adversarial domain adaptation", ICML, 2018, 15 pages.

Huang et al., "Arbitrary style transfer in real-time with adaptive instance normalization", ICCV, 2017, 10 pages.

Isola et al., "Image-to-image translation with conditional adversarial networks", CVPR, 2017, 17 pages.

(56) References Cited

OTHER PUBLICATIONS

Johnson et al., "Perceptual losses for real-time style transfer and super-resolution", ECCV, 2016, 17 pages.
Kim et al., "Learning to discover cross-domain relations with generative adversarial networks", ICML, 2017, 10 pages.
Kingma et al., "Adam: A method for stochastic optimization", ICLR, 2015, 15 pages.
Kraehenbuehl et al., "Efficient inference in fully connected crfs with gaussian edge potentials", NIPS, 2011, 9 pages.
Lafferty et al., "Conditional random fields: Probabilistic models for segmenting and labeling sequence data", ICML, 2001, 10 pages.
Lin et al., "Scribblesup: Scribble-supervised convolutional networks for semantic segmentation", CVPR, 2016, 9 pages.
Liu et al., "Unsupervised image-to-image translation networks", NIPS, 2017, 11 pages.
Long et al., "Fully convolutional networks for semantic segmentation", CVPR, 2015, 10 pages.
Mao et al., "Least squares generative adversarial networks", ICCV, 2017, 16 pages.
Menze et al., "The multimodal brain tumor image segmentation benchmark (brats)", IEEE trans. medical imaging, 2015, 32 pages.
Radford et al., "Unsupervised representation learning with deep convolutional generative adversarial networks", ICLR, 2016, 16 pages.
Roweis et al., "Nonlinear dimensionality reduction by locally linear embedding", Science, 2000, 3 pages.
Shrivastava et al., "Learning from simulated and unsupervised images through adversarial training", CVPR, 2017, 10 pages.
Simonyan et al., "Very deep convolutional networks for large-scale image recognition", arXiv preprint arXiv:1409.1556, 2014, 14 pages.
Tang et al., "On regularized losses for weakly-supervised cnn segmentation", ECCV, 2018, 16 pages.
Tenenbaum et al., "A global geometric framework for nonlinear dimensionality reduction", Science, 2000, 5 pages.
Van der Maaten et al., "Visualizing data using t-sne", JMLR, 2008, 27 pages.
Wang et al., "Highresolution image synthesis and semantic manipulation with conditional gans", CVPR, 2018, 10 pages.
Wang et al., "Learnable histogram: Statistical context features for deep neural networks", ECCV, 2016, 17 pages.
Weston et al., "Deep learning via semisupervised embedding", Neural Networks: Tricks of the Trade, pp. 639-655, 2012.
Yi et al., "Dualgan: Unsupervised dual learning for image-to-image translation", ICCV, 2017, 9 pages.
Zhang et al., "Harmonic Unpaired Image-to-Image Tranlsation", ICLR 2019, 19 pages.
Zhang et al., "StackGAN: Text to photo-realistic image synthesis with stacked generative adversarial networks", arXiv preprint, 2017, 9 pages.
Zhang et al., "Translating and segmenting multimodal medical vols. with cycle-and shapeconsistency generative adversarial network", CVPR, 2018, 9 pages.
Zheng et al., "Conditional random fields as recurrent neural networks", ICCV, 2015, 17 pages.
Zhu et al., "CycleGAN failure cases" https://github.com/junyanz/CycleGAN#failure-cases, <https://github.com/junyanz/CycleGAN> 2018, 2 pages.
Zhu et al., "Semi-supervised learning using gaussian fields and harmonic functions", ICML, 2003, 8 pages.
Zhu et al., "Toward multimodal image-to-image translation", NIPS, 2017, 12 pages.
Zhu et al., "Unpaired image-to-image translation using cycle-consistent adversarial networks", ICCV, 2017, 18 pages.
Zhu, "Semi-supervised learning literature survey", Computer Science, University of Wisconsin-Madison, 2006, 60 pages.

* cited by examiner

TRAINING IMAGE-TO-IMAGE TRANSLATION NEURAL NETWORKS

CROSS REFERENCE TO RELATED APPLICATIONS

This U.S. patent application is a continuation of, and claims priority under 35 U.S.C. § 120 from, U.S. patent application Ser. No. 16/688,773, filed on Nov. 19, 2019, which claims priority under 35 U.S.C. § 119(e) to U.S. Provisional Application 62/769,211, filed on Nov. 19, 2018. The disclosures of these prior applications are considered part of the disclosure of this application and are hereby incorporated by reference in their entireties.

TECHNICAL FIELD

This disclosure relates to training image-to-image translation neural networks.

BACKGROUND

This specification relates to training machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an image-to-image neural network system implemented as computer programs on one or more computers in one or more locations that trains a neural network to translate a source image in a source domain to a corresponding target image in a target domain.

The subject matter described in this specification can be implemented in particular embodiments so as to realize one or more of the following advantages. The training techniques described in this specification allow a system to train a bi-directional image translation neural network on an unpaired dataset in an unsupervised manner. Existing supervised training methods require using labeled training data that is difficult to obtain and timely and computationally expensive to generate (e.g., requiring a human or computer tool to manually provide mappings between source training images in a source domain and target training images in a target domain). In contrast, the training techniques described herein can utilize a large amount of unsupervised training data that are generally readily available through publicly accessible sources, e.g., on the Internet, thereby reducing computational/labor costs for labeling data. In particular, by incorporating a harmonic loss and circularity loss to an objective function for training the translation neural network, the training techniques enforces similarity-consistency and self-consistency properties during translations, therefore providing a strong correlation between the source and target domain and producing trained translation neural networks that have better performance than neural networks that are trained using conventional methods. The trained neural network can generate target images with higher quality while requiring less training time and less computational/labor costs for labeling during training.

The training techniques described is this specification are useful in many applications such as medical imaging (e.g., medical image synthesis), image translation, and semantic labeling.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 2(*a*) and 2(*b*) illustrate a harmonic loss that is used to train the forward generator neural network G.

Like reference numbers and designations in the various drawings indicate like elements.

DETAILED DESCRIPTION

This specification describes an image-to-image translation neural network system implemented as computer programs on one or more computers in one or more locations that trains a neural network to translate a source image in a source domain to a corresponding target image in a target domain.

For example, the source image is a grayscale image and the corresponding target image is a color image that depicts the same scene as the grayscale image, or vice versa. In another example, the source image is a map of a geographic region, and the corresponding target image is an aerial photo of the geographic region, or vice versa. In another example, the source image is an RGB image and the corresponding target image is a sematic segmentation of the image, or vice versa. In yet another example, the source image is a thermal image and the corresponding target image is an RGB image, or vice versa. In yet another example, the source image is an RGB image and the corresponding target image is detected edges of one or more objects depicted in the image, or vice versa. In yet another example, the source image is a medical image of a patient's body part that was taken using a first method (e.g., MRI scan), and the target image is another medical image of the same body part that was taken using a second, different method (e.g., computerized tomography (CT) scan), or vice versa.

Figure 1:
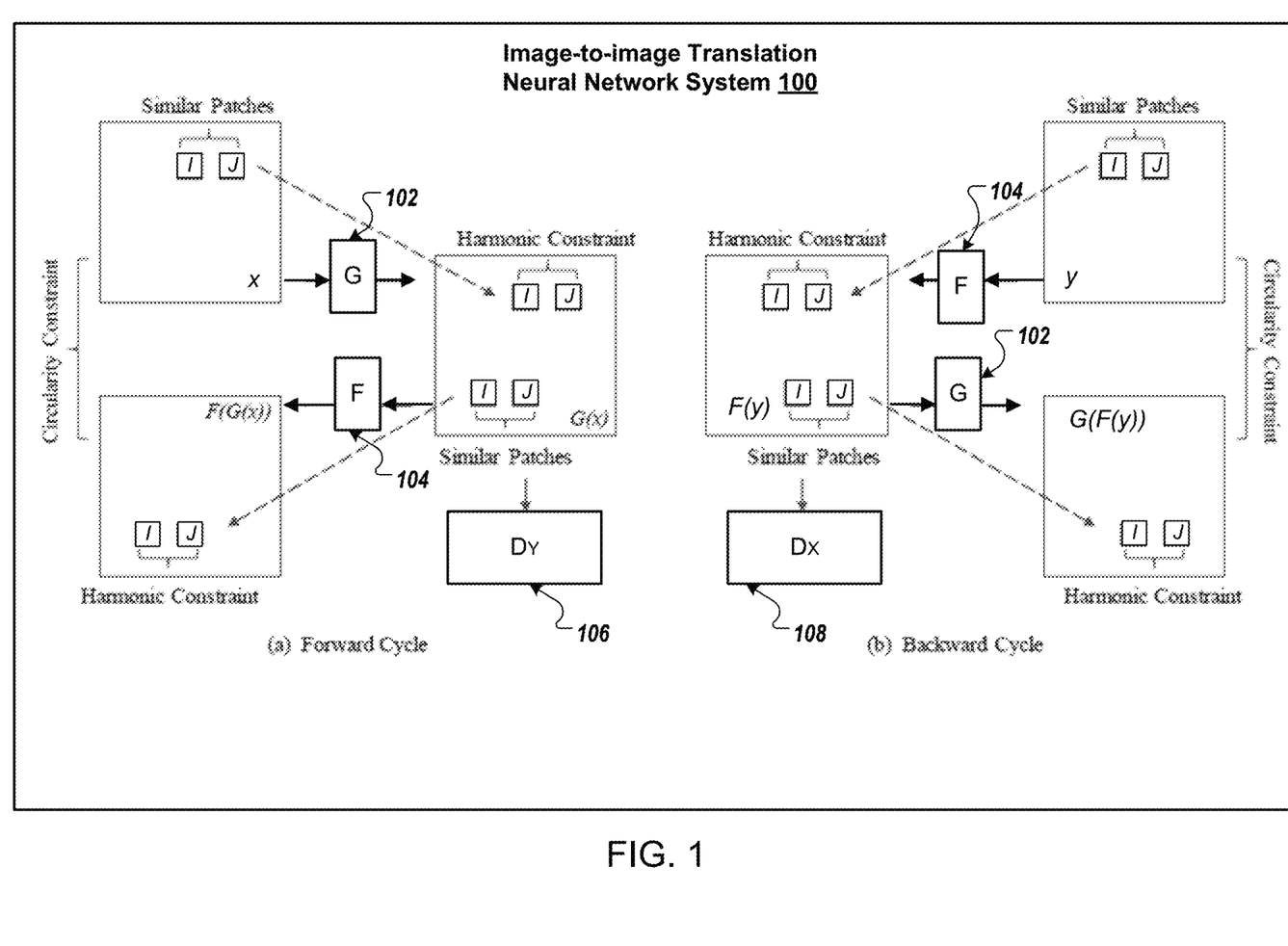
FIG. 1 shows an architecture of an example image-to-image translation neural network system that trains a forward generator neural network G to translate a source image in a source domain X to a corresponding target image in a target domain Y.

FIG. 1 shows an example image-to-image translation neural network system 100. The system 100 is an example of a system implemented as computer programs on one or more computers in one or more locations, in which the systems, components, and techniques described below can be implemented.

The system 100 includes a forward generator neural network G (102) and a backward generator neural network F (104) (also referred to as "the forward generator G" and "the backward generator F" for simplicity). The forward generator neural network G is configured to translate a source image in a source domain to a corresponding target image in a target domain. The backward generator neural network F is configured to translate a target image in the target domain to a corresponding source image in the source domain.

Given source domain X and a target domain Y, to train the forward generator neural network G and the backward generator neural network F, the system 100 obtains a source training dataset that is sampled from the source domain X according to a source domain distribution. The source training dataset can be denoted as $\{x_i\}_{i=1}^{N}$, where $x_i \in X$ represents a source training image in the source training dataset and N is the number of source training images in the source training dataset. The system 100 further obtains a target training dataset sampled from the target domain Y according to a target domain distribution. The target training dataset can be denoted as $\{y_i\}_{i=1}^{N}$ where $y_i \in Y$ represents a target training image in the target training dataset and N is the number of target training images in the target training dataset. The source training images in the source training dataset and the target training images in target training dataset are unpaired. That is, the system 100 does not have access to or, more generally, does not make use of any data that associates an image in the source data set with an image the target data set.

The image-to-image translation system 100 aims to train the forward generator neural network G and the backward generator neural network F to perform a pair of dual mappings (or dual translations), including (i) a forward mapping G: X→Y, which means the forward generator neural network G is trained to translate a source image in the source domain X to a corresponding target image in the target domain Y, and (ii) a backward mapping F: Y→X, which means the backward generator neural network F is trained to translate a target image in the target domain Y to a corresponding source image in the source domain X.

To evaluate performance of the forward generator neural network G and the backward generator neural network F, the system 100 further includes a source discriminator neural network $D_X$ (106) and a target discriminator neural network $D_Y$ (108) (also referred to as "the source discriminator $D_Y$" and "the target discriminator $D_X$" for simplicity). The system 100 can use the source discriminator $D_X$ to distinguish a real source image $\{x \in X\}$ from a translated source image $\{F(y)\}$ that is generated by the target generator F, and use the target discriminator $D_Y$ to distinguish a real target image $\{y \in Y\}$ from a generated target image $\{G(x)\}$ that is generated by the source generator G.

The source discriminator $D_X$ is configured to determine, given a first random image, a probability that the first random image belongs to the source domain X. The target discriminator $D_Y$ is configured to determine, given a second random image, a probability that the second random image belongs to the target domain Y.

In part (a) of the procedure shown in FIG. 1, for each source training image x in the source training dataset X, the system 100 translates, using the forward generator neural network G, the source training image x to a respective translated target image G(x) in the target domain Y according to current values of forward generator parameters of the forward generator neural network G. The system 100 then uses the backward generator F to translate the translated target image G(x) to a circularly-translated source image F(G(x)) in the source domain X. The image F(G(x)) is referred to as a circularly-translated source image because the original source image x is translated back to itself after one cycle of translation, i.e., after a forward translation is G(x) performed on x by the forward generator G and a backward translation F(G(x)) is performed by the backward generator F on the output G(x) of the forward generator G.

In part (b) of the procedure shown in FIG. 1, for each target training image in the target training dataset, the system 100 translates, using a backward generator neural network F, the target training image y to a respective translated source image F(y) in the source domain X according to current values of backward generator parameters of the backward generator neural network F. The system 100 then uses the forward generator G to translate the translated source image F(y) a circularly-translated target image G(F(y)) in the target domain Y. The image G(F(y)) is referred to as a circularly-translated target image because the original target image y is translated back to itself after one cycle of translation, i.e., after a backward translation F(y) is performed on y by the backward generator F and a forward translation G(F(y)) is performed by the forward generator G on the output F(y) of the backward generator F.

The system 100 trains the forward generator neural network G jointly with the backward generator neural network F, with the source discriminator neural network $D_X$ having source discriminator parameters, and with the target discriminator neural network $D_Y$ having target discriminator parameters. During the joint training, the system 100 adjusts current values of the forward generator parameters, the backward generator parameters, the source discriminator parameters, and the target discriminator parameters to optimize an objective function. For instance, the system 100 can backpropagate an estimate of a gradient of the objective function to jointly adjust the current values of the forward generator parameters of the forward generator G, the backward generator parameters of the backward generator F, the source discriminator parameters of the source discriminator $D_X$, and the target discriminator parameters of the target discriminator $D_Y$.

The objective function includes a harmonic loss component (also referred to as "harmonic loss"). Generally, the harmonic loss is used to enforce a strong correlation between the source and target domains by ensuring similarity-consistency between image patches during translations.

Specifically, for the forward translation G: X→Y, let $\phi$ denote an energy function that represents a patch in a particular image of the source domain or the target domain as a multi-dimensional vector, $\phi(x, i)$ denote a representation of any patch i in a source image x in an energy space, and $\phi(G(x), i)$ denote a representation of patch i in the corresponding translated target image G(x). If two patches i and j are similar in the source image x, the similarity of patches should be consistent during image translation, i.e., the two patches i, j should also be similar in the translated target image G(x). By using the harmonic loss to train the source generator G and target generator F, the system 100 can ensure (i) similarity-consistency between patches in each source training image and patches in its corresponding translated target image, and (ii) similarity-consistency between patches in each target training image and patches in its corresponding translated source image.

The system 100 formulates the similarity of patches in the energy space using a distance metric M (also referred to as "the distance function M"). The distance metric M measures a distance between two patches in a particular image by taking the distance between two multi-dimensional vectors corresponding to the two patches.

For example, the system 100 can select cosine similarity as the distance metric M. If the distance of patches i and j in x is smaller than a threshold t, the patches i and j are treated as a pair of similar patches. The system 100 minimizes the distance of corresponding patches i and j in the translated target image G(x) by imposing a first harmonic loss expressed as follows:

$$L_{harm}(x, G(x)) = \sum_{M(\phi(x,i),\phi(x,j))<t} M(\phi(G(x), i), \phi(G(x), j)) \quad (1)$$

The first harmonic loss in Equation 1 represents, for a given source training image x and a corresponding translated target image G(x), a sum of distances between all pairs of patches in the translated target image for which the distances of the corresponding pairs of patches in the given source training image are less than the threshold t.

In addition, the system 100 may impose a second harmonic loss on the backward mapping from the translated images back to the original images, i.e., F(y)→G(F(y)) and G(x)→F(G(x)). The second harmonic loss can be formulated as:

$$L_{harm}(F(y), G(F(y))) = \sum_{M(\phi(F(y),i),\phi(F(y),j))<t} M(\phi(G(F(y)), i), \phi(G(F(y)), j)) \quad (2)$$

The second harmonic loss in Equation 2 represents, for a given target training image y and a corresponding circularly-translated target image G(F(y)), a sum of the distances between all pairs of patches in the circularly-translated target image for which the distances of the corresponding pairs of patches in the target training image are less than the threshold t.

For the forward cycle shown in FIG. 1(a), x→G(x)→F(G(x))~x, the first and second harmonic losses are applied in both forward and backward mappings.

Similarly, a third and fourth harmonic losses are applied in the two mappings in the backward cycle shown in FIG. 1(b), y→F(y)→G(F(y))~y. The third harmonic loss can be represented as:

$$L_{harm}(y, F(y)) = \sum_{M(\phi(y,i),\phi(y,j))<t} M(\phi(F(y), i), \phi(F(y), j)) \quad (3)$$

The above third harmonic loss represents, for a given target training image y and a corresponding translated source image F(y), a sum of distances between all pairs of the patches in the translated source image for which the distances of the corresponding pairs of patches in the given target training image are less than a threshold.

The fourth harmonic loss can be expressed as:

$$L_{harm}(G(x), F(G(x))) = \sum_{M(\phi(G(x),i),\phi(G(x),j))<t} M(\phi(F(G(x)), i), \phi(F(G(x)), j)) \quad (4)$$

The above fourth harmonic loss represents, for a given source training image x and a corresponding circularly-translated source image F(G(x)), a sum of distances between all pairs of patches in the circularly-translated source image for which the distances of the corresponding pairs of patches in the source training image are less than the threshold t.

The overall harmonic loss is the sum of the four losses mentioned above and is formulated as:

$$\mathcal{L}_{harm}(G,F) = \mathbb{E}_{x \in X} L_{harm}(x, G(x)) + \mathbb{E}_{y \in Y} L_{harm}(y, F(y)) + \mathbb{E}_{x \in X, y \in Y} L_{harm}(F(y), G(F(y))) + \mathbb{E}_{x \in X, y \in Y} L_{harm}(F(G(X))) \quad (5)$$

Figure 2A:
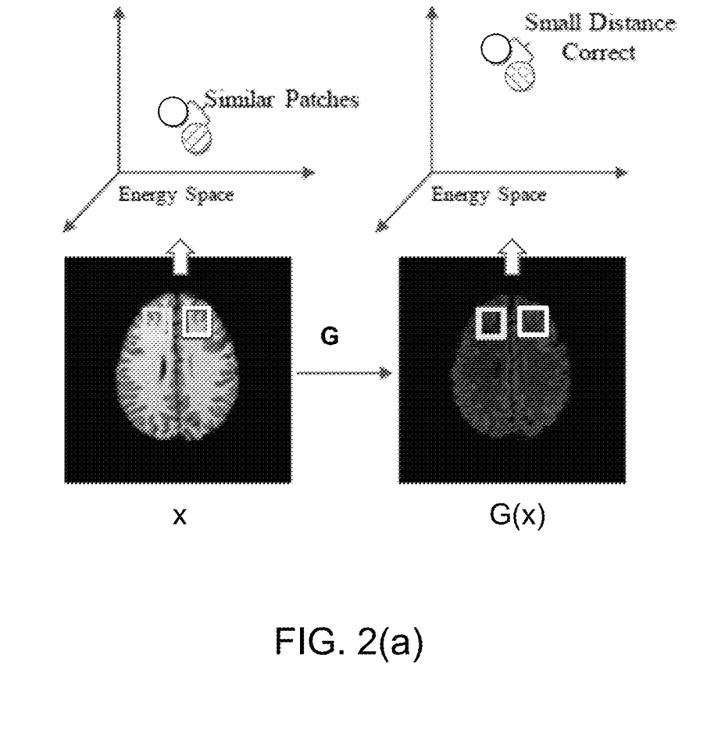
Figure 2B:
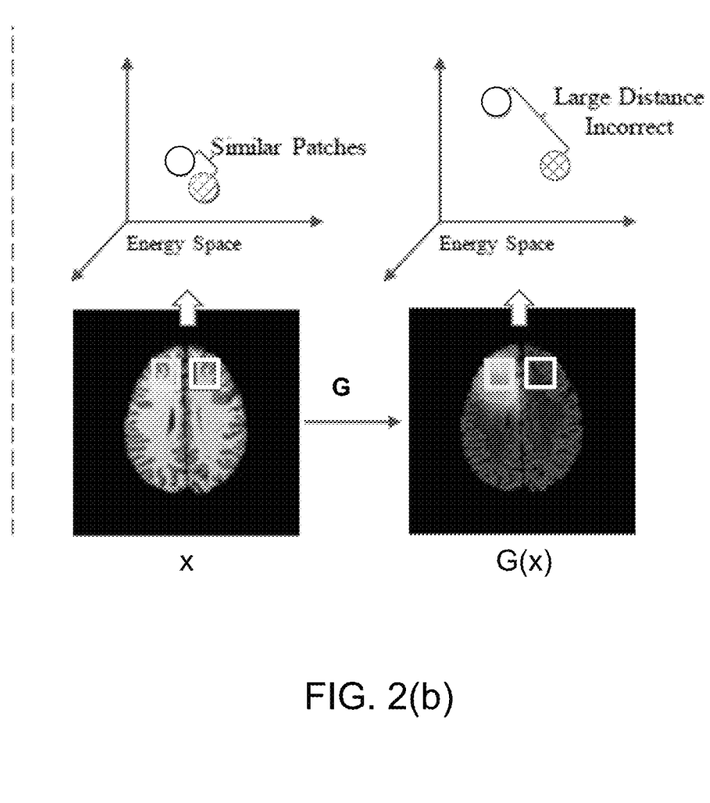

The harmonic loss establishes a direct connection between an original image and its corresponding translated image. Because the harmonic loss ensures the translation is similarity-consistent in the energy space, some inherent properties of original image are maintained during the translation. For example, FIGS. 2(a) and 2(b) illustrate how the harmonic loss is used to train the forward generator neural network G to translate a source medical image in a source domain to a target medical image in a target domain for a cross-modal medical image synthesis task. As shown in FIG. 2(a), two patches of similar non-tumor regions in an original image x are selected. The two patches have similar representations in the energy space. If the translation preserves the non-tumor property of these two patches in the translated image G(x), the two patches will also have similarity in the energy space, as shown in the upper right part of FIG. 2(a). Otherwise, if one patch is translated to a tumor region, which means the translation accidentally adds a tumor into the original sample generating an unexpected result, the two patches will have a large distance in the energy space, as shown in the upper right part of FIG. 2(b). This way, the harmonic loss preserves keep the inherent property during the translation and prevents some unexpected results.

In some implementations, the objective function includes an adversarial loss component (also referred to as "adversarial loss") that ensures the translation accuracy of the forward generator neural network G and the backward generator neural network F. In particular, the adversarial loss component includes a first adversarial loss term applied in the target domain Y, expressed as:

$$\mathcal{L}_{GAN}(G,D_Y,X,Y) = \mathbb{E}_{y \in Y}[\log D_Y(y)] \mathbb{E}_{x \in X}[\log(1-D_Y(G(x)))] \quad (6)$$

where $\mathbb{E}_{y \in Y}[\log D_Y(y)]$ represents how accurately the target discriminator neural network $D_Y$ can distinguish between a real target image sampled from the target domain Y and an output of the forward generator neural network G, and $\mathbb{E}_{x \in X}[\log(1-D_Y(G(x)))]$ represents how accurately the forward generator neural network G can generate an output that can be considered as being sampled from the target domain Y according to the target domain distribution.

Further, the adversarial loss component includes a second adversarial loss term applied in the source domain X, expressed as:

$$L_{GAN}(F,D_X,X,Y) = E_{x \in X}[\log D_X(x)] E_{y \in Y}[\log(1-D_x(F(y)))] \quad (7)$$

where $\mathbb{E}_{x \in X}[\log D_X(x)]$ represents how accurately the source discriminator neural network $D_X$ can distinguish between a real source image sampled from the source domain X and an output of the backward generator neural network F, and $\mathbb{E}_{y \in Y}[\log(1-D_X(F(y)))]$ represents how accurately the backward generator neural network F can generate an output that can be considered as being sampled from the source domain X according to the source domain distribution.

In some implementations, the objective function includes a circularity loss component (also referred to as "circularity loss") that ensures that the forward generator neural network G and the backward generator neural network F are a pair of inverse translation operations, i.e., a translated image could be mapped back to the original image. The circularity loss contains consistencies of two aspects: the forward cycle x→G(x)→F(G(x))~x, and the backward cycle y→F(y)→G(F(y))~y. Thus, the circularity loss can be formulated as:

$$\mathcal{L}_{cyc}(G,F) = \mathbb{E}_{x \in X} \|F(G(x)) - x\|_1 + \mathbb{E}_{y \in Y} \|G(F(y)) - y\|_1 \quad (8)$$

where $\mathbb{E}_{x \in X}\|F(G(x))-x\|_1$ ensures that a source training image x from the source training dataset can be translated to a circularly-translated source image F(G(x)) that is the same as the source training image x after the source training image x is translated by the forward generator neural network G and subsequently by the backward generator neural network F, and $\mathbb{E}_{y \in Y}\|G(F(y))-y\|_1$ ensures that a target training image y from the target training dataset can be translated to a circularly-translated target image G(F(y)) that is the same as the target training image y after the target training image y is translated by the backward generator neural network F and subsequently the forward generator neural network G.

The combination of adversarial loss component and circularity loss component can be represented as:

$$\mathcal{L}(G,F,D_X,D_Y) = \lambda_{GAN}\mathcal{L}_{GAN}(G,D_Y,X,Y) + \lambda_{GAN}\mathcal{L}_{GAN}(F,D_X,X,Y) + \lambda_{cyc}\mathcal{L}_{cyc}(G,F) \quad (9)$$

where $\lambda_{GAN}$ and $\lambda_{cyc}$ are importance factors that control the importance of corresponding loss component.

Thus, a full objective function that includes the overall harmonic loss, the adversarial loss component and the circularity loss component can be expressed as follows:

$$\mathcal{L}(G,F,D_X,D_Y) = \lambda_{GAN}\mathcal{L}_{GAN}(G,D_Y,X,Y) + \lambda_{GAN}\mathcal{L}_{GAN}(F,D_X,X,Y) + \lambda_{cyc}\mathcal{L}_{cyc}(G,F) + \lambda_{Harm}\mathcal{L}_{Harm}(G,F) \quad (10)$$

The system 100 backpropagates an estimate of a gradient of the full objective function to jointly adjust the current values of the forward generator parameters of the forward generator G, the backward generator parameters of the backward generator F, the source discriminator parameters of the source discriminator $D_X$, and the target discriminator parameters of the target discriminator $D_Y$.

The system 100 repeatedly (i) samples new source training dataset from the source domain and new target training dataset from the target domain and (ii) performs the above training process on the new source and target training dataset to update the parameters of the forward generator G, the backward generator F, the source discriminator $D_X$ and the target discriminator $D_Y$.

After training, the system 100 can use the trained forward generator G to translate a new source image in the source domain X to a corresponding target image in the target domain Y. The system 100 can use the trained backward generator F to translate a new target image in the target domain Y to a corresponding source image in the source domain X. In some implementations, the system 100 can provide the trained forward generator G, the backward generator G, or both F and G to another system for use.

Figure 3:
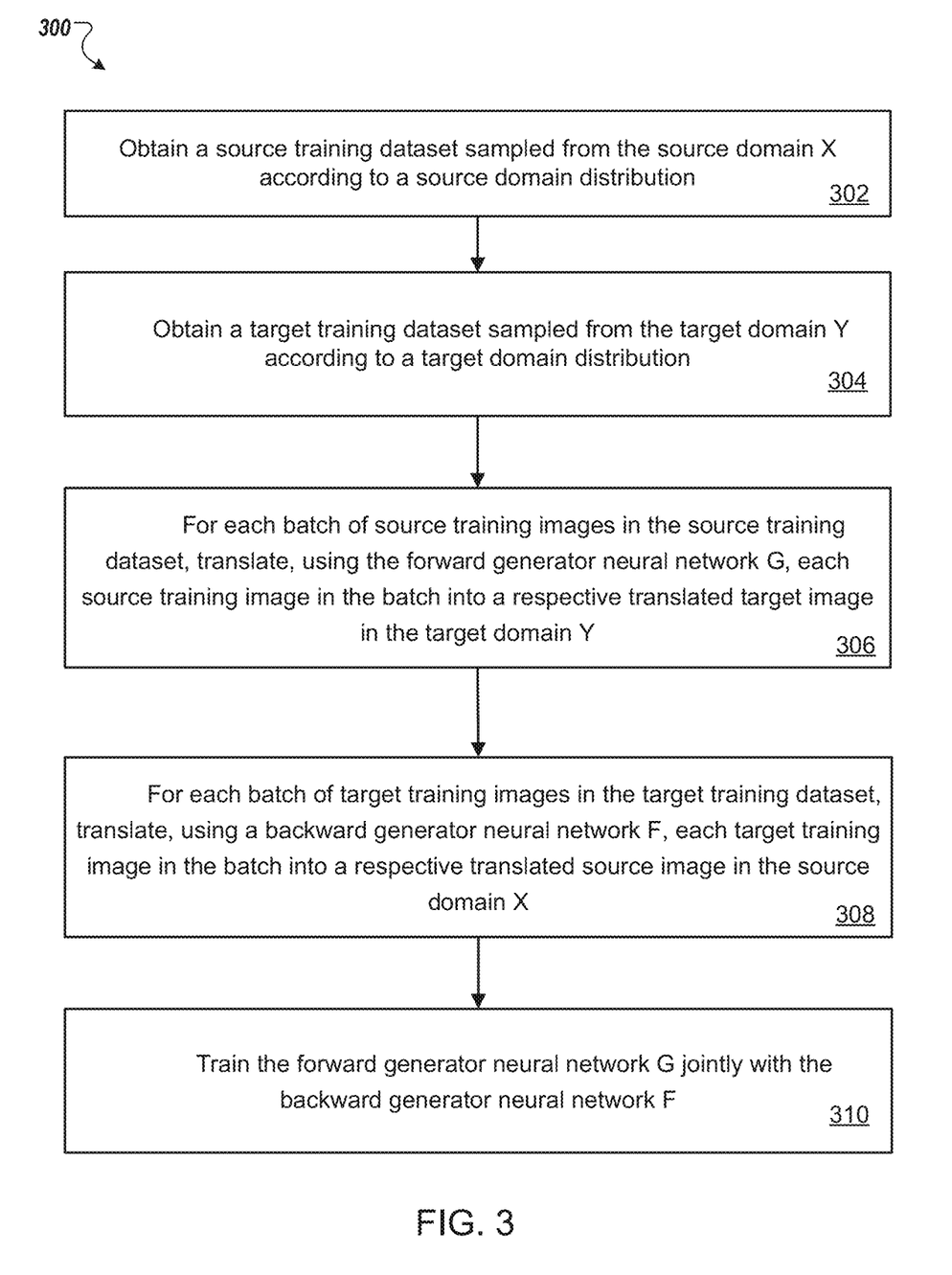
FIG. 3 is a flow diagram of an example process for training a forward generator neural network G to translate a source image in a source domain X to a corresponding target image in a target domain Y.

FIG. 3 is a flow diagram of an example process for training a forward generator neural network G to translate a source image in a source domain X to a corresponding target image in a target domain Y. For convenience, the process 300 will be described as being performed by a system of one or more computers located in one or more locations. For example, a neural network system, e.g., the image-to-image translation neural network system 100 of FIG. 1, appropriately programmed in accordance with this specification, can perform the process 300.

The system obtains a source training dataset sampled from the source domain X according to a source domain distribution (step 302). The source training dataset comprising a plurality of source training images.

The system obtains a target training dataset sampled from the target domain Y according to a target domain distribution (step 304). The target training dataset comprising a plurality of target training images.

For each source training image in the source training dataset, the system translates, using the forward generator neural network G, the source training image to a respective translated target image in the target domain Y according to current values of forward generator parameters of the forward generator neural network G (step 306).

For each target training image in the target training dataset, the system translates, using a backward generator neural network F, the target training image to a respective translated source image in the source domain X according to current values of backward generator parameters of the backward generator neural network F (step 308).

The system trains the forward generator neural network G jointly with the backward generator neural network F by adjusting the current values of the forward generator parameters and the backward generator parameters to optimize an objective function (step 310). The objective function includes a harmonic loss component that ensures (i) similarity-consistency between patches in each source training image and patches in its corresponding translated target image, and (ii) similarity-consistency between patches in each target training image and patches in its corresponding translated source image.

In particular, the harmonic loss component is determined based on (i) an energy function that represents a patch in a particular image of the source domain or the target domain as a multi-dimensional vector, and (ii) a distance function that measures a distance between two patches in the particular image by taking the distance between two multi-dimensional vectors corresponding to the two patches. The energy function may be an RGB histogram energy function or a semantic energy function.

The harmonic loss component may include at least one of a first harmonic loss term, a second harmonic loss term, a third harmonic loss term, or a fourth harmonic loss term.

The first harmonic loss term represents, for a given source training image and a corresponding translated target image, a sum of distances between all pairs of patches in the translated target image for which the distances of the corresponding pairs of patches in the given source training image are less than a threshold.

The second harmonic loss term represents, for a given target training image and a corresponding circularly-translated target image, a sum of the distances between all pairs of patches in the circularly-translated target image for which the distances of the corresponding pairs of patches in the target training image are less than a threshold.

The third harmonic loss term represents, for a given target training image and a corresponding translated source image, a sum of distances between all pairs of the patches in the translated source image for which the distances of the corresponding pairs of patches in the given target training image are less than a threshold.

The fourth harmonic loss term represents, for a given source training image and a corresponding circularly-translated source image, a sum of distances between all pairs of patches in the circularly-translated source image for which the distances of the corresponding pairs of patches in the source training image are less than a threshold.

In some implementations, the system can train the forward generator neural network G jointly with the backward generator neural network F and other neural networks. In particular, the system may train the forward generator neural network G jointly with the backward generator neural network F, with a source discriminator neural network $D_X$ having source discriminator parameters, and with a target discriminator neural network $D_Y$ having target discriminator parameters. The source discriminator neural network $D_X$ is configured to determine, given a first random image, a probability that the first random image belongs to the source domain X. The target discriminator neural network $D_Y$ is configured to determine, given a second random image, a probability that the second random image belongs to the target domain Y.

In these implementations, to improve the performance of the forward generator G and backward generator F, the objective function can further include an adversarial loss component and a circularity loss component. The adversarial loss component ensures the translation accuracy of the forward generator neural network G and the backward generator neural network F. The circularity loss component ensures that the forward generator neural network G and the backward generator neural network F are a pair of inverse translation operations. During the joint training, the system adjusts current values of the forward generator parameters, the backward generator parameters, the source discriminator parameters, and the target discriminator parameters to optimize an objective function that is determined by a weighted combination of the harmonic loss component, the adversarial loss terms, and the circularity loss component.

In some implementations, the energy function can be an RGB histogram energy function to obtain low-level representations of patches. Since the gradient of a standard histogram is not computable, the system 100 utilizes a soft replacement of histograms which is differentiable and the gradient is back-propagateable. This differentiable histogram function includes a family of linear basis functions $\psi_b$, b=1, ..., B, where B is the number of bins in the histogram. Let $P_x^i$ represent a patch i in image x, then for each pixel j in $P_x^i$, $\psi_b(P_x^i(j))$ represents the pixel j voting for the b-th bin and is expressed as:

$$\psi_b(P_x^i(j)) = \max\{0, 1 - |P_x^i(j) - \mu^b| \times w_b\} \quad (11)$$

where $\mu_b$ and $\omega_b$ are the center and width of the b-th bin. The representation of $P_x^i$ in RGB space is the linear combination of linear basis functions on all of the pixels in $P_x^i$ and is expressed as:

$$\phi_h(x, i, b) = \phi_h(p_x^i, b) = \sum_j \psi_b(P_x^i(j)) \quad (12)$$

where $\phi_h$ is the RGB histogram energy function, b is the index of dimension of the RGB histogram representation, j represents any pixel in the patch $P_x^i$. The RGB histogram representation $\phi_h(x, i)$ of $P_x^i$ is a B dimensional vector.

In some other implementations, the energy function can be a semantic energy function to obtain higher level representations of patches. The semantic representations are extracted from a pre-trained Convolutional Neural Network (CNN). The CNN encodes semantically relevant features from training on a large scale dataset. The CNN extracts semantic information of local patches in the image through multiple pooling or stride operators. Each point in the feature maps of the CNN is a semantic descriptor of the corresponding image patch. Additionally, the semantic features learned from the CNN are differentiable, and the CNN can be integrated into the image-to-image translation neural network system 100 and be trained end-to-end with other neural networks in the system 100. In some implementations, the semantic energy function can be initiated as $\phi_s$ as a pre-trained CNN model.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of the disclosure or on the scope of what may be claimed, but rather as descriptions of features that may be specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method when executed on data processing hardware causes the data processing hardware to perform operations comprising:
   obtaining a source training image in a source domain;
   selecting, from the source training image, a first source patch and a second source patch each representative of respective portions of the source training image;
   translating, using a forward generator neural network, the source training image to a translated target image in a target domain according to parameters of the forward generator neural network, the translated target image comprising a third source patch and a fourth source patch each representative of respective portions of the translated target image, the third source patch and the fourth source patch of the translated target image corresponding to the first source patch and the second source patch of the source training image;
   determining a first energy distance between the first source patch and the second source patch of the source training image;
   determining a second energy distance between the third source patch and the fourth source patch of the translated target image;
   generating a harmonic loss based on the first energy distance and the second energy distance; and
   updating, using the harmonic loss, the parameters of the forward generator neural network.

2. The computer-implemented method of claim 1, wherein the operations further comprise determining, by a target discriminator neural network, a probability that the translated target image belongs to the target domain.

3. The computer-implemented method of claim 1, wherein the operations further comprise:
   obtaining a target training image in the target domain;
   selecting, from the target training image, a first target patch and a second target patch each representative of respective portions of the target training image;
   translating, using a backward generator neural network, the target training image to a translated source image in the source domain according to parameters of the backward generator neural network, the translated source image comprising a third target patch and a fourth target patch each representative of respective portions of the translated source image, the third target patch and the fourth target patch of the translated source image corresponding to the first target patch and the second target patch of the target training image;
   determining a third energy distance between the first target patch and the second target patch of the target training image;
   determining a fourth energy distance between the third target patch and the fourth target patch of the translated source image;
   generating a second harmonic loss based on the third energy distance and the fourth energy distance; and
   updating, using the second harmonic loss, the parameters of the backward generator neural network.

4. The computer-implemented method of claim 3, wherein the operations further comprise determining, by a source discriminator neural network, a probability that the translated source image belongs to the source domain.

5. The computer-implemented method of claim 3, wherein updating the parameters of the forward generator neural network comprises optimizing an objective function.

6. The computer-implemented method of claim 5, wherein the objective function comprises an adversarial loss component that ensures translation accuracy of the forward generator neural network and the backward generator neural network.

7. The computer-implemented method of claim 6, wherein the objective function further comprises a circularity loss component that ensures that the forward generator neural network and the backward generator neural network comprise inverse translation operations.

8. The computer-implemented method of claim 7, wherein the objective function comprises a weighted combination adversarial loss terms and the circularity loss component.

9. The computer-implemented method of claim 1, wherein selecting the first source patch and the second source patch of the source training image comprises determining whether the first energy distance between the first source patch and the second source patch of the source training image satisfies a threshold value.

10. The computer-implemented method of claim 1, wherein the operations further comprise jointly updating the parameters of the forward generator neural network and parameters of a backward generator neural network.

11. A system comprising:
    data processing hardware; and
    memory hardware in communication with the data processing hardware, the memory hardware storing instructions that when executed on the data processing hardware cause the data processing hardware to perform operations comprising:
      obtaining a source training image in a source domain;
      selecting, from the source training image, a first source patch and a second source patch each representative of respective portions of the source training image;
      translating, using a forward generator neural network, the source training image to a translated target image in a target domain according to parameters of the forward generator neural network, the translated target image comprising a third source patch and a fourth source patch each representative of respective portions of the translated target image, the third source patch and the fourth source patch of the translated target image corresponding to the first source patch and the second source patch of the source training image;
      determining a first energy distance between the first source patch and the second source patch of the source training image;

determining a second energy distance between the third source patch and the fourth source patch of the translated target image;

generating a harmonic loss based on the first energy distance and the second energy distance; and updating, using the harmonic loss, the parameters of the forward generator neural network.

12. The system of claim 11, wherein the operations further comprise determining, by a target discriminator neural network, a probability that the translated target image belongs to the target domain.

13. The system of claim 11, wherein the operations further comprise:

obtaining a target training image in the target domain;

selecting, from the target training image, a first target patch and a second target patch each representative of respective portions of the target training image;

translating, using a backward generator neural network, the target training image to a translated source image in the source domain according to parameters of the backward generator neural network, the translated source image comprising a third target patch and a fourth target patch each representative of respective portions of the translated source image, the third target patch and the fourth target patch of the translated source image corresponding to the first target patch and the second target patch of the target training image;

determining a third energy distance between the first target patch and the second target patch of the target training image;

determining a fourth energy distance between the third target patch and the fourth target patch of the translated source image;

generating a second harmonic loss based on the third energy distance and the fourth energy distance; and updating, using the second harmonic loss, the parameters of the backward generator neural network.

14. The system of claim 13, wherein the operations further comprise determining, by a source discriminator neural network, a probability that the translated source image belongs to the source domain.

15. The system of claim 13, wherein updating the parameters of the forward generator neural network comprises optimizing an objective function.

16. The system of claim 15, wherein the objective function comprises an adversarial loss component that ensures translation accuracy of the forward generator neural network and the backward generator neural network.

17. The system of claim 16, wherein the objective function further comprises a circularity loss component that ensures that the forward generator neural network and the backward generator neural network comprise inverse translation operations.

18. The system of claim 17, wherein the objective function comprises a weighted combination adversarial loss terms and the circularity loss component.

19. The system of claim 11, wherein selecting the first source patch and the second source patch of the source training image comprises determining whether the first energy distance between the first source patch and the second source patch of the source training image satisfies a threshold value.

20. The system of claim 11, wherein the operations further comprise jointly updating the parameters of the forward generator neural network and parameters of a backward generator neural network.

* * * * *